United States Patent [19]
Nagata

[11] Patent Number: 5,972,080
[45] Date of Patent: Oct. 26, 1999

[54] SEPARATION MEMBRANE

[75] Inventor: Yoshitomo Nagata, Chiba, Japan

[73] Assignee: Dainippon Ink and Chemicals, Inc., Tokyo, Japan

[21] Appl. No.: 08/900,705

[22] Filed: Jul. 25, 1997

[30] Foreign Application Priority Data

| Jul. 26, 1996 | [JP] | Japan | 8-197480 |
| Jun. 17, 1997 | [JP] | Japan | 9-159695 |

[51] Int. Cl.⁶ .................... B01D 53/22; B01D 71/64
[52] U.S. Cl. ........................ 96/13; 95/54; 96/14
[58] Field of Search ................ 95/54; 96/4, 8, 96/10, 13, 14; 210/500.39

[56] References Cited

U.S. PATENT DOCUMENTS

| Re. 30,351 | 7/1980 | Hoehn et al. | 96/4 X |
| 3,816,303 | 6/1974 | Wrasidlo | 210/500.39 X |
| 4,113,628 | 9/1978 | Alegranti | 210/500.39 X |
| 4,378,324 | 3/1983 | Makino et al. | 210/500.39 X |
| 5,015,270 | 5/1991 | Ekiner et al. | 96/14 X |
| 5,034,026 | 7/1991 | Summers et al. | 96/13 X |
| 5,034,027 | 7/1991 | Tien et al. | 96/14 X |
| 5,055,114 | 10/1991 | Kawakami et al. | 96/14 X |
| 5,061,298 | 10/1991 | Burgoyne, Jr. et al. | 96/14 X |
| 5,141,642 | 8/1992 | Kusuki et al. | 210/500.39 X |
| 5,232,472 | 8/1993 | Simmons et al. | 96/14 |
| 5,248,319 | 9/1993 | Ekimer et al. | 96/14 X |
| 5,266,100 | 11/1993 | Simmons | 96/14 X |
| 5,286,539 | 2/1994 | Kusuki et al. | 96/13 X |
| 5,320,650 | 6/1994 | Simmons | 96/14 |
| 5,334,697 | 8/1994 | Simmons | 96/14 X |
| 5,409,524 | 4/1995 | Jehsvold et al. | 96/14 X |
| 5,429,748 | 7/1995 | White et al. | 210/500.39 X |
| 5,635,067 | 6/1997 | Macheras | 210/500.39 X |

OTHER PUBLICATIONS

Okamoto, et al., "Gas Permeability of Polyimide Films," Kobunshi Kako 1992, 41(1), 16–26 (Japan).

Okamoto, et al, "Molecular Design of Polymeric Membranes for Gas Separation," Kobunshi 1993, 42(8), 682–7.

Robeson, et al., "High Performance Polymers for Membrane Separation," Polymer, vol. 35, No. 23 4970–4978 (1994).

Xuesong et al., "Gas Permeation Properties of Some Polypyrrolones," Journal of Membrane Science, 88 (1994) 37–45.

Hidetoshi Kita, "Permeability and Permseelectivity of Gases in Polyimides and Polypyrrolones Prepared from Diaminobenzidine", Polymer Preprints, Japan, vol. 43, No. 7 (1994).

Yongli Mi, "Criteria for Synthesizing Highly Selective Membrane Materials", Hyoumen (Surface), vol. 33 (No. 5) (1995) 308–319.

Y. Hirayama, et al., "Relation of Gas Permeability with Structure of Aromatic Polyimides I," Journal of Membrane Science 111 (1996) 169–182.

T. Unishi, Polymer Letters, "Preparation of Aromatic Polyimide–Amide," vol. 3, pp. 679–683 (1965).

Unishi et al., "The Synthesis of Polypryromellitimide–amide," Yuki Gosei Kagaku (Journal of Synthetic Organic Chemistry; Japan), vol. 23, pp. 1028–1033.

Imai et al., "Polymers Containing Pyromellitimide Units," Die Makromolekulare Chemie 94 (1966) 144–123.

Motoo, Saga et al., "The Syntheses of Polypryomellitimide–amides," Bulletin of Chemical Society of Japan, vol. 39 (1966) 1795–1800.

Terunobu et al., "Poly(pyromellitimideamides)," Kogyo Kagaku Zasshi (Journal of the Chemical Society of Japan, Industrial Chemical Section), vol. 70, pp. 192–195 (1967).

*Primary Examiner*—Robert Spitzer
*Attorney, Agent, or Firm*—Armstrong, Westerman, Hattori, McLeland & Naughton

[57] ABSTRACT

Separation membranes excellent in strength, durability, heat resistance and solvent resistance as well as in balance between substance separation properties and substance permeability are disclosed, which are formed from polyhydrazidoimide resins, and preferably comprises a non-porous dense layer formed from a polyhydrazidoimide resin obtained from the reaction of an aromatic tetracarboxylic dianhydride such as 4,4'-(hexafluoroisopropylidene) diphthalic anhydride and an aromatic dihydrazide such as isophthalic dihydrazide as essential components.

8 Claims, 1 Drawing Sheet

FIGURE
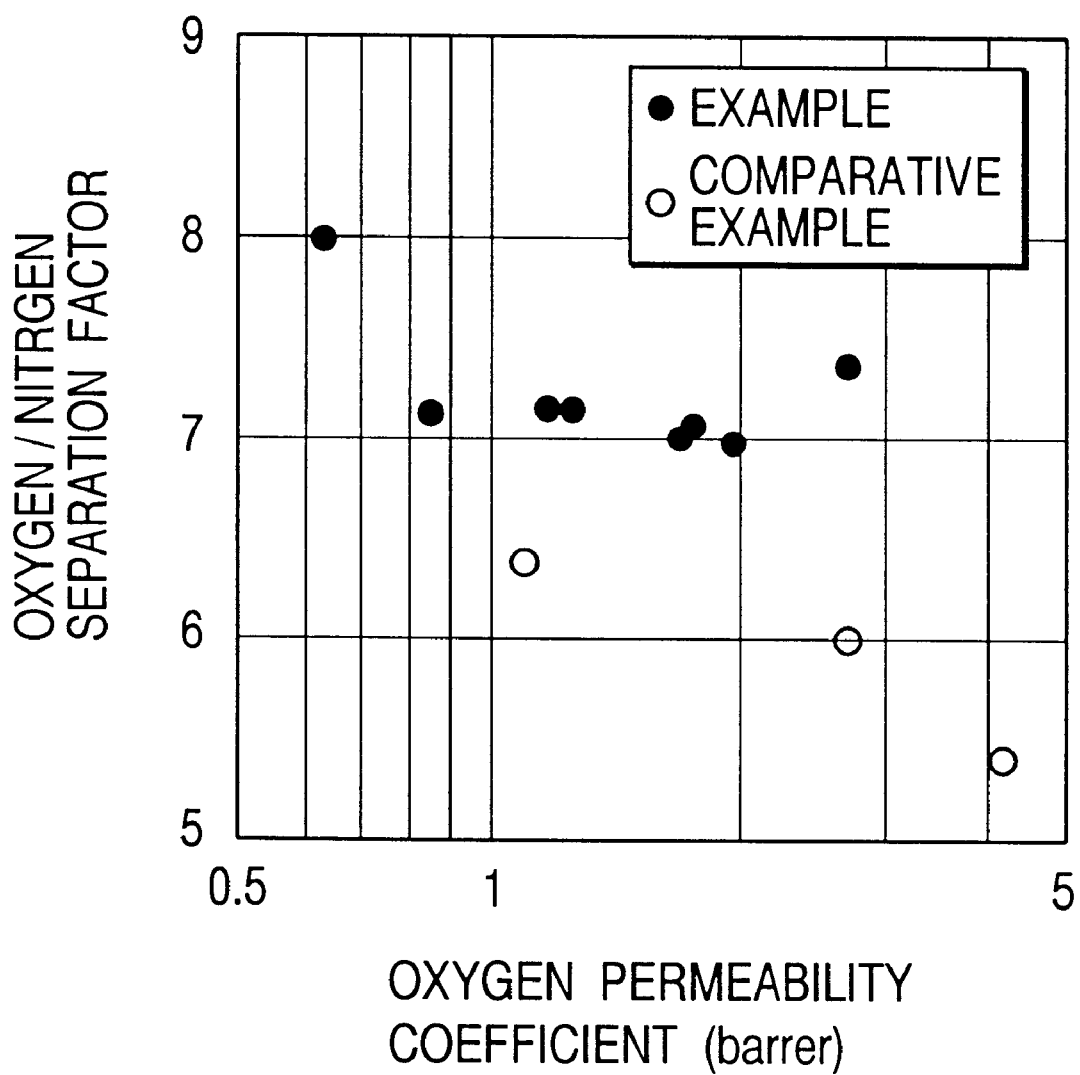

SEPARATION MEMBRANE

FIELD OF THE INVENTION

The present invention relates to separation membranes having a good balance between separation property and permeability, which is excellent in various properties such as strength, heat resistance, durability and solvent resistance.

BACKGROUND OF THE INVENTION

The separation of substances by membranes is advantageous from the standpoint of energy efficiency as compared with other separation methods and is characterized by the use of a small-sized light-weight apparatus, a simple mechanism and a maintenance-free operation. Thus, it is widely applied to various industries.

The separation membrane has the following basic requirements:

(1) Separation ability of separating the target substance from other components;

(2) Permeability to substances; and (3) Properties such as strength, heat resistance, durability and solvent resistance The separation properties of the membranes, if they are dense membranes, are essentially inherent to the material of the membranes and are primarily characteristics governing the yield of substances to be separated, i.e., characteristics governing the running cost.

On the other hand, the permeability properties of the membranes to substances are characteristics mainly governing the required area of membrane and the size of membrane module and apparatus, i.e., initial cost. Thus, industrially feasible properties can be realized by the development of materials having a high permeability to substances and the formation of the thin film of the dense permselective layer.

In general, the ability of the membrane to separate substances and the permeability of the membrane to substances conflict with each other. The development of membrane materials having an excellent balance between the two characteristics has been extensively made. Aromatic polymer materials have excellent gas permeabilities and excellent gas separation abilities. Extensive studies have been made using various aromatic polymer materials for gas separation particularly. Many studies focusing polyimides, polyimidazopyrrolones, etc. are reported in articles and reviews, e.g., *Kobunshi Kako* (*Polymer Applications*), vol. 41, page 16 (1992), *Kobunshi* (*High Polymers, Japan*), vol. 42, page 682 (1993), *Polymer,* vol. 35, page 4970 (1994), *Journal of Membrane Science,* vol. 88, page 37 (1994), *Polymer Preprints Japan,* vol. 43, page 2273 (1994), *Hyoumen* (*Surface*), vol. 33, page 308 (1995), *Journal of Membrane Science,* vol. 111, page 169 (1996).

Recently, it has been found that among a large number of polymer materials polyimides resin exhibited a good balance between gas separation properties and gas permeability and is excellent in properties such as strength, durability, heat resistance and solvent resistance. Extensive studies have been made of gas separation membrane and pervaporation membrane having a non-porous dense layer formed from polyimides.

On the other hand, a polyhydrazidoimide resin synthesized from pyromellitic dianhydride and isophthalic dihydrazide via precursor polyhydrazide is reported as a heat-resistant aromatic polyimide-amide in *Journal of Polymer Science,* Part B, Polymer Letters, vol. 3, page 679 (1965). Further, several kinds of polyhydrazidoimide resins as polyimide-amides are reported in *Yuki Gosei Kagaku* (*Journal of Synthetic Organic Chemistry, Japan*), vol. 23, page 1028 (1965), *Die Makromolekulare Chemie"*, vol. 94, page 114 (1966), *Bulletin of the Chemical Society of Japan"*, vol. 39, page 1795 (1966), and *Kogvo Kagaku Zasshi* (*Journal of the Chemical Society of Japan, Industrial Chemistry Section*), vol. 70, page 192 (1967). However, no reports have been made of a separation membrane formed from polyhydrazidoimide resins and their substance separation properties.

The permeability of gas separation membranes can be improved by reducing the thickness of the non-porous dense layer. However, the separation properties of gas separation membranes are attributed to the characteristics inherent to the materials constituting the membranes. Accordingly, if materials having excellent separation properties are not available, the gas separation membranes cannot fully compete with rival techniques such as low-temperature processing and Pressure Swing Adsorption (PSA).

Gas separation membranes which have already been put into practical use are generally used for low purity gases. Accordingly, it is said that in order to promote the use of a separation membrane in the application including high purity gas covered by rival techniques such as low-temperature processing and Pressure Swing Adsorption, materials which exhibit an oxygen/nitrogen separation factor of not less than 7 are needed. However, no separation membranes having separation properties which can be practically satisfied have ever been found.

SUMMARY OF THE INVENTION

An object of the present invention is to provide a separation membrane excellent in strength, durability, heat resistance and solvent resistance having an excellent balance between substance separation properties and permeability to substances.

The inventor made extensive studies paying their attention to polyhydrazidoimide resins as polymers containing hydrazidoimide structure which have the nitrogen atom in the imide ring and the nitrogen atom in the amide bond which are directly connected to each other, in the repeating unit to obtain better separation membranes as compared with polyimides or the like. As a result, it was found that polyhydrazidoimide resins are excellent in properties such as strength, durability, heat resistance and solvent resistance similarly to polyamideimides containing imide bonds and amide bonds and exhibit a good balance between separation properties and permeability, excellent particularly in gas separation properties, as compared with these resins. Thus, the present invention has been worked out.

In other words, in order to accomplish the foregoing objects, the present invention provides:

(1) Separation membranes formed from polyhydrazidoimide resins;

(2) The separation membrane according to Clause (1), having a non-porous dense layer formed from polyhydrazidoimide resins;

(3) The separation membranes according to Clause (2), which are gas-separation membranes;

(4) The separation membranes according to Clause (2), having a composite structure comprising a non-porous dense layer formed from polyhydrazidoimide resins and a porous supporting layer formed from materials different from the resin constituting said non-porous dense layer;

(5) The separation membranes according to any one of Clauses (1) to (4), wherein said polyhydrazidoimide resins are polymers obtained from the reaction of aromatic tetracarboxylic dianhydrides and aromatic dihydrazides as essential components;

(6) The separation membranes according to Clause (5), wherein said aromatic tetracarboxylic dianhydride is 4,4'-(hexafluoroisopropylidene)diphthalic anhydride; and (7) The separation membranes according to Clause (5), wherein said aromatic dihydrazide is isophthalic dihydrazide or terephthalic dihydrazide.

BRIEF DESCRIPTION OF THE DRAWING

FIG. 1 is a graph illustrating the relationship between the oxygen permeability coefficient and the oxygen/nitrogen separation factor of the various dense symmetrical membranes obtained in Examples 1 to 9 and Comparative Examples 1 to 3.

DETAILED DESCRIPTION OF THE INVENTION

The polyhydrazidoimide resins to be used in the present invention are polymer compounds containing in their repeating unit the structure (hydrazidoimide structure) represented by the following general formula (1):

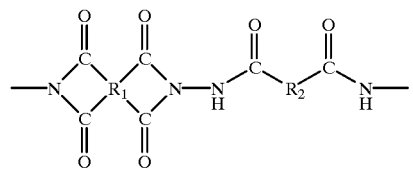

wherein $R_1$ represents a tetra-substituted residue; and $R_2$ represents a di-substituted residue, in which structure the nitrogen atom in the imide ring and the nitrogen atom in the amide bond are directly bonded to each other. In the general formula (1), $R_1$ is preferably a tetra-substituted residue having aromatic, heterocyclic or alicyclic rings, more preferably tetra-substituted residues represented by the following general formula:

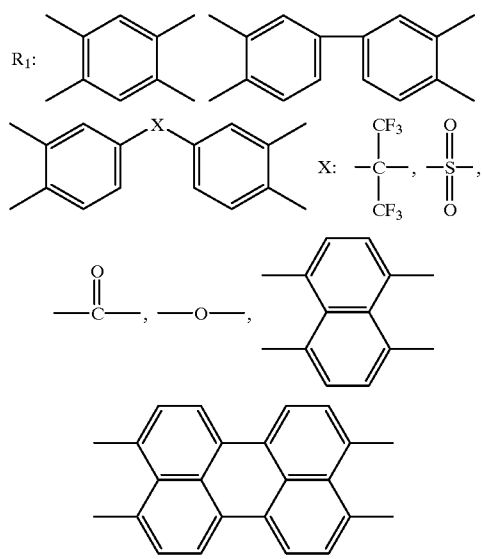

wherein $R_2$ is preferably a di-substituted residue having aromatic, heterocyclic or alicyclic rings, more preferably di-substituted residues represented by the following general formula:

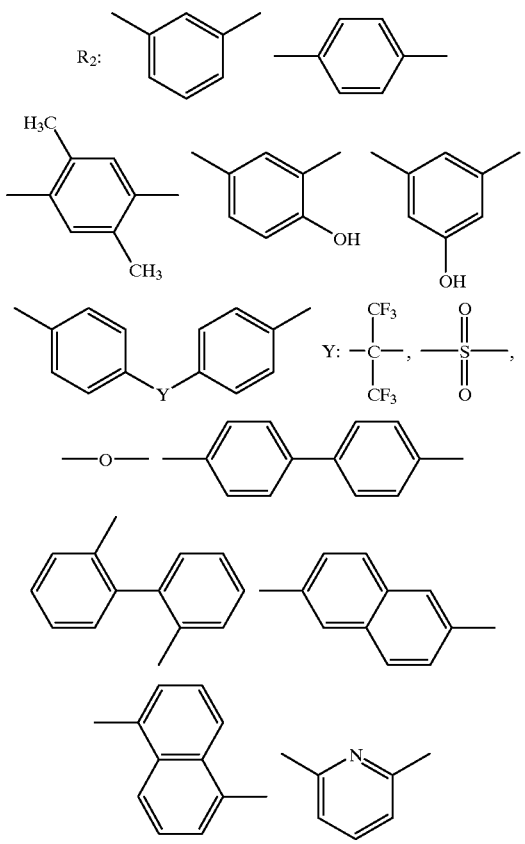

The polyhydrazidoimide resins to be used in the present invention are not particularly limited as long as they have a molecular weight enough to maintain the film shape. It is preferred that the polyhydrazidoimide resins of the present invention have an intrinsic viscosity of not less than 0.4.

Such polyhydrazidoimide resins can be prepared by the copolymerization of tetracarboxylic acids, dihydrazides and optionally other copolymerizable compounds in proper solvents such as N-methylpyrrolidone, N,N-dimethylacetamide, dimethyl sulfoxide and sulfolane. In this copolymerization process, reaction aids for the polymerization of polyamides, polyimides, polyhydrazides, etc., such as benzoic acid, pyridine, triethylamine, triphenyl phosphite and tetraethyl ammoniums may be added to the reaction system. Alternatively, the polyhydrazidoimide resins can be prepared by the polymerization of dicarboxylic-derivatives such as dicarboxylic acid and dicarboxylic dichloride with bis(N-aminoimide) compounds.

The tetracarboxylic acids to be used in the preparation of the polyhydrazidoimide resins are not specifically limited. In practice, however, tetracarboxylic acid, tetracarboxylic dianhydride, tetracarboxylic diester diacid and tetracarboxylic diester dichloride having rings such as aromatic ring, heterocyclic ring and alicyclic ring are preferred. These tetracarboxylic acids may be used singly or in admixture.

Preferred among these tetracarboxylic acids is tetracarboxylic dianhydride. Examples of the tetracarboxylic dianhydride include aromatic tetracarboxylic dianhydride such as pyromellitic dianhydride (hereinafter referred to as "PMDA"), 3,3',4,4'-biphenyltetracarboxylic dianhydride, 3,3',4,4'-benzophenonetetracarboxylic dianhydride, 3,3',4, 4'-diphenylethertetracarboxylic dianhydride, 3,3',4,4'-diphenylsulfonetetracarboxylic dianhydride, 4,4'-(hexafluoroisopropylidene)diphthalic dianhydride (hereinafter referred to as "6FDA"), 4,4'-methylenediphthalic anhydride, 4,4'-ethylenediphthalic anhydride, 4,4'-isopropylidenediphthalic anhydride, azobenzenetetracarboxylic dianhydride, naphthalene-1,4,5,8-tetracarboxylic dianhydride, anthracenetetracarboxylic dianhydride and perylene-3,4,9,10-tetracarboxylic dianhydride; heterocyclic tetracarboxylic dianhydride such as pyridinetetracarboxylic dianhydride, thiophenetetracarboxylic dianhydride and furantetracarboxylic dianhydride; and alicyclic tetracarboxylic dianhydride such as cyclobutane tetracarboxylic dianhydride, cyclopentanetetracarboxylic dianhydride, cyclohexanetetracarboxylic dianhydride and bicyclooctenetetracarboxylic dianhydride. Preferred among these tetracarboxylic dianhydrides are aromatic tetracarboxylic dianhydrides. Most preferred among these aromatic tetracarboxylic dianhydrides is 6FDA, which provides excellent gas permselectivity and good solubility characteristics.

The dihydrazides to be used in the preparation of the polyhydrazidoimide resin are not specifically limited. In practice, however, dihydrazides having rings such as aromatic ring, heterocyclic ring and alicyclic ring are preferred. Particularly preferred among these dihydrazides are aromatic dihydrazides. Examples of such aromatic dihydrazides include phthalic dihydrazide (e.g., isophthalic dihydrazide and terephthalic dihydrazide), naphthalenedicarboxylic dihydrazide (e.g., 2,6-naphthalene dicarboxylic dihydrazide), hydroxyisophthalic dihydrazide, dimethylterephthalic dihydrazide, biphenyldicarboxylic dihydrazide, benzophenonedicarboxylic dihydrazide, diphenyletherdicarboxylic dihydrazide, diphenylsulfonedicarboxylic dihydrazide, hexafluoroisopropylidenediphthalic dihydrazide. Most preferred among these aromatic dihydrazides are isophthalic dihydrazide, terephthalic dihydrazide and 2,6-naphthalene dicarboxylic dihydrazide.

The polydihydrazidoimide resins to be used in the present invention may be copolymers of dihydrazides with copolymerizable compounds such as diamine, triamine and tetraamine. Examples of such copolymers include amide, imide and/or imidazopyrrolone copolymers.

The copolymerizable compounds are not specifically limited. In practice, however, amino compounds to be used in the synthesis of polyimides, polyimidazopyrrolones, etc. are preferred. Examples of such diamine include phenylenediamine-derivatives such as phenylenediamine (e.g., m-phenylenediamine, p-phenylenediamine) and compounds obtained by substituting some of hydrogen atoms in the benzene ring in these phenylenediamines by alkyl groups, carboxyl groups, hydroxyl groups, alkoxy groups, nitro groups, halogen atoms, etc. (e.g., 2,4-diaminotoluene, 2,5-dimethyl-1,4-phenylenediamine, 2,4,6-trimethyl-1,3-phenylenediamine, 3,5-diaminobenzoic acid, 2,4-diaminophenol, 2,4-diaminoanisole, 2,4-diaminonitrobenzene, 2-chloro-5-methyl-1,4-phenylenediamine); aromatic diamines such as compounds having two or more biphenyl-bonded benzene rings, compounds having two or more benzene rings bonded to each other via ether bonds, thioether bonds, carbonyl groups, sulfone groups, sulfide groups, methylene groups, isopropylidene groups, hexafluoroisopropylidene groups, amino groups, amide bonds, etc., compounds obtained by substituting some of hydrogen atoms in the benzene rings in these diamino compounds by alkyl groups, aryl groups, carboxy groups, hydroxy groups, alkoxy groups, nitro groups, halogen atoms, etc. (e.g., 3,3'-dimethylbenzidine, 3,3',5,5'-tetramethylbenzidine, 3,3'-dihydroxybenzidine, dianisidine, 3,3'-dichlorobenzidine, 3,3'-diamino-4,4'-dihydroxybiphenyl, 4,4'-diaminodiphenylether, 4,4'-diaminobenzophenone, 4,4'-diaminodiphenylsulfone, 4,4'-diaminodiphenylsulfide, 4,4'-diaminodiphenylmethane, 4,4'-diamino-3,3',5,5'-tetramethyldiphenylmethane, 4,4'-diamino-3,3'-diethyl-5,5'-dimethyldiphenylmethane, 4,4'-diamino-3,3'-dicarboxydiphenylmethane, 2,2-bis(4-(4-aminophenoxy)-3,5-dibromophenyl)propane, 9,9-bis(4-aminophenyl)fluorene, 2,2-bis(4-aminophenyl)hexafluoropropane, 2,2-bis(3-amino-4-hydroxyphenyl)hexafluoropropane, 4,4'-diaminobenzanilide), 1,5-naphthalenediamine, 2,7-diaminofluorene and 3,3'-dimethylnaphthidine; heterocyclic diamines such as 2,6-diaminoipyridine and diaminocarbazole; triamines such as 1,2,4-triaminobenzene and 3,4,4'-triaminobiphenylether; and tetramines such as 1,2,4,5-tetraminobenzene and 3,3',4,4'-tetraminobiphenyl.

Preferred among these amines are amines having an aromatic ring. Particularly preferred among these amines having aromatic rings are p-phenylenediamine, 2,4-diaminotoluene, 2,5-dimethyl-1,4-phenylenediamine, 2,4,6-trimethyl-1,3-phenylenediamine, 3,3'-dimethylbenzidine, 3,3',5,5'-tetramethylbenzidine, 4,4'-diamino-3,3',5,5'-tetramethyldiphenylmethane, 4,4'-diamino-3,3'-diethyl-5,5'-dimethyldiphenylmethane, 9,9-bis(4-aminophenyl)fluorene, 2,2-bis(4-aminophenyl)hexafluoropropane, 2,2-bis(3-amino-4-hydroxyphenyl)hexafluoropropane, 1,5-naphthalenediamine, 3,3'-dimethylnaphthidine, 1,2,4-triaminobenzene, 3,4,4'-triaminobiphenylether, 1,2,4,5-tetraamionobenzene, and 3,3',4,4'-tetraaminobiphenyl.

Among the polyhydrazidoimide resins employable in the present invention, the polyhydrazidoimide resin free of copolymerizable components exhibit an excellent gas permeation selectivity with respect to various gases as compared with known polyimides and polyamideimides. Further, referring to polyhydrazidoimide resins comprising copolymerizable components, amines to be used in the synthesis of polyimides, polyimidazopyrrolones, etc. can be used as copolymerizable components to produce copolymers which exhibit well-controlled properties, i.e., an improved gas permeability, without impairing gas selectivity too much. In these case, as such copolymerizable components there may be preferably used those having their good gas permeability.

The type of the separation membrane of the present invention is not specifically limited. Examples of the type of separation membrane include dense symmetrical membrane, microporous membrane, asymmetrical membrane (membrane comprising a non-porous dense layer made of polyhydrazidoimide resins and a porous supporting layer), and composite membrane (membrane comprising a non-porous dense layer made of polyhydrazidoimide resins and a porous supporting layer made of resins different from the resin constituting the non-porous dense layer). Preferred among these types of membranes are dense symmetrical membrane, asymmetrical membrane and composite membrane comprising a non-porous dense layer made of polyhydrazidoimide resins, which are excellent in substance separation properties and permeability to substances. The shape of the separation membrane may be arbitrary, e.g., plane membrane, hollow fiber membrane, tubular membrane, monolithic membrane (tubular membrane having a plurality of cores).

If the separation membranes of the present invention have a non-porous dense layer made of polyhydrazidoimide resins, the surface of the non-porous dense layer may be coated or sealed with materials having high gas permeability such as silicone and polyacetylene to inhibit slight occurrence of pinholes (micropores) therein. Further, polyimide resins, polysulfone resins, etc. may be used for sealing. In order to raise the gas selectivity, the dense layer may be subjected to surface treatment with chlorine or fluorine gas, plasma treatment, ultraviolet treatment or the like.

The separation membranes of the present invention are particularly useful as membranes comprising a non-porous dense layer made of polyhydrazidoimide resins as a permselective layer, such as gas (including vapor herein) separation membranes and pervaporation membranes. The present invention will be described hereinafter with reference to gas separation membranes.

The term "gas permselective layer" as used herein is meant to indicate a substantially non-porous dense layer the dissolution and diffusion of gas in which material determines the mechanism of permeation of gas to membrane. The presence of a gas permselective layer in the membrane can be easily confirmed by the fact that the gas separation factor of the membrane coincides with the essential gas separation factor of the material constituting the gas separation active layer within the variation range of characteristics regardless of the thickness of the gas permselective layer.

The preferable gas separation membranes have a sufficiently thin gas permselective layer without pinholes. The shape or form of the membranes are not specifically limited. For example, dense symmetrical membrane, asymmetrical membrane, composite membranes, etc. may be used. Referring to the shape of membranes, plane membranes or hollow fiber membranes can be provided. Most preferred among these shapes is hollow fiber membrane, which can provide a great membrane area per compact unit volume.

The hollow fiber membranes made of polyhydrazidoimide resins can be prepared by, e.g., the following method.

In some detail, a hollow fiber membrane can be prepared by so-called dry-wet process which comprises extruding a dope of polyhydrazidoimide resins (spinning dope of resin) into a gas phase through a tubular capillary nozzle with a core fluid used for the purpose of retaining the hollow fiber shape and raising the porosity of the inner layer in the hollow fiber, and then dipping the dope thus extruded in a coagulating bath (liquid in which the resins are insoluble but with which the organic solvents used for the dope are miscible) so that the dope is coagulated.

Alternatively, composite hollow fiber membranes can be prepared by a process which comprises co-extruding (a) a polyhydrazidoimide resin dope from which a polymer layer having a dense gas permselective layer made of polyhydrazidoimide resins is prepared and (b) a polymer dope from which a porous supporting layer is prepared through a multiple tubular capillary nozzle into a gas phase to form a hollow fiber having a multi-layer structure composed of core fluid, dope (b) and dope (a) in this order from core to shell, and then dipping the hollow fiber in a coagulating bath so that the dopes are coagulated.

As the solvents to be used for the dope there may be used one which can dissolve the polyhydrazidoimide resins therein and has a good compatibility with the coagulating bath. Examples of such solvents include halogenated alkyl solvents such as dichloromethane, chloroform and 1,1,2-trichloroethane; halogenated phenol solvents such as o-chlorophenol, p-chlorophenol and dichlorophenol; amide solvents such as N,N-dimethylformamide, N,N-dimethylacetamide and N-methylpyrrolidone; sulfur-containing solvents such as dimethyl sulfoxide and sulfolane; hexamethylphosphoric triamide; γ-butyrolactone; dioxane; and diethylene glycol dimethyl ether. Preferred among these solvents are water-soluble organic solvents such as N,N-dimethylformamide, N,N-dimethylacetamide and N-methylpyrrolidone. These solvents may be used singly or in admixture.

For the purpose of enhancing the stability and spinnability of the dope or improving the gas permeation selectivity of the resulting membrane, the foregoing dope can further comprise other additive compounds incorporated therein as necessary. Examples of the other additive compounds include polymers such as low molecular poly (ethyleneglycol), poly(propyleneglycol), poly(vinylalcohol) and poly(vinylpyrrolidone); volatile components such as acetone and tetrahydrofuran; poor solvents such as toluene and xylene; acids such as acetic acid, propionic acid and butyric acid; water-soluble polyvalent alcohols such as ethylene glycol and glycerin; and inorganic salts such as lithium chloride, lithium bromide, potassium chloride, potassium bromide, calcium chloride and magnesium chloride.

As the fluid to be used as the core fluid when the dope is extruded into a hollow fiber there may be used gases or liquids. For example, gases such as nitrogen and air or liquids such as water, methanol, ethanol, propanol, glycerin and mixtures thereof may be used. If necessary, the core fluid may comprise inorganic salts such as lithium chloride, lithium bromide and potassium chloride, solvents for the resin such as N-methyl pyrrolidone and N,N-dimethyl acetamide, poor solvents for the dope resin such as acetone, methyl ethyl ketone, xylene, toluene, acetic acid and propionic acid, etc. incorporated therein in a proper amount.

The atmosphere in which the dope is extruded may be a gas phase such as air, nitrogen or solvent vapor or a liquid phase such as water, preferably a gas phase. Referring to the atmosphere, the air stream can be properly controlled. If necessary, the temperature and humidity can be properly controlled.

The single layer or multi-layer dope which has been extruded through the multiple tubular capillary nozzle into a hollow fiber is then allowed to come in contact with a coagulating bath to undergo coagulation. As the coagulating bath there may be used any liquid in which the resin constituting the hollow fiber membrane is insoluble but with which the solvent used for the dope is miscible. Examples of such a coagulating bath include lower alcohols such as methanol, ethanol, 1-propanol and 2-propanol; ketones such as acetaldehyde and acetone; water; and mixtures thereof. The coagulating bath may comprise substances such as organic solvent, salt, acid and alkali incorporated therein. Preferred among these coagulating baths are water and a mixture of water with other organic solvents.

If the separation membrane of the present invention is a composite membrane, i.e., if the material constituting the non-porous dense layer is different from that constituting the porous layer, the material constituting the porous supporting layer is arbitrary. In some detail, any resins other than polyhydrazidoimide resin may be used so far as they can be thoroughly bonded to the non-porous dense layer made of polyhydrazidoimide resins and exhibit mechanical strength, heat resistance, chemical resistance and weather resistance sufficient for practical use of the membrane. The material may be a mixture or copolymer of two or more such resins. The polyhydrazidoimide resin has a good adhesivity (miscibility) with other polymers. If the polyhydrazidoimide resin is formed into a hollow fiber composite membrane, the degree of freedom of selection of the material constituting the porous supporting layer is high. Therefore, by selecting proper materials for this purpose, high performance separation membranes can be provided.

Preferred examples of the resin from which the foregoing porous supporting layer is prepared include polyamide resin, polyimide resin, polyetherimide resin, polyamideimide resin, polysulfone resin, polybenzimidazole resin, polybenzoxazole resin, polybenzthiazole resin, polyquinoxaline resin, and polypiperazine resin. These resins may be used singly or in admixture.

Examples of the foregoing polysulfone resin include polysulfone, polyethersulfone, polyallylsulfone, and polyphenylsulfone. Various polysulfone resins are commercially available.

The non-porous dense layer can be formed on the inner surface and/or outer surface of the hollow fiber by properly selecting the composition, concentration and temperature of the dope, the composition of the coagulating bath, the composition of the inner fluid, the spinning conditions, etc., if the membrane is a hollow fiber membrane, or by changing the order of the foregoing dopes (a) and (b) to be arranged from the core side, if the membrane is a composite hollow fiber membrane. In particular, the composite membrane having a dense layer formed on the outer surface of the hollow fiber can be easily mass-produced and exhibits an excellent gas permeation selectivity. The dimension of the hollow fiber membrane is arbitrary and can be properly adjusted to outer diameter, inner diameter and other factors suitable for practical use. In some detail, by control the composition, concentration and temperature of the dope, the composition of the coagulating bath, the composition of the inner fluid, the spinning conditions (dope extrusion rate, winding speed of hollow fiber formed, etc.), etc., hollow fibers having, e.g., an outer diameter of not more than 1,500 $\mu$m and a thickness of not more than 500 $\mu$m can be prepared.

It is preferred that the organic solvent remaining in the membrane thus obtained be substantially removed. The removal of the remaining organic solvent can be accomplished, e.g., by a process which comprises washing the membrane with hot water and/or a volatile solvent which dissolves the organic solvent therein so that the remaining organic solvent is replaced by water or the volatile solvent, and then drying the membrane in vacuo.

Examples of the volatile solvent which dissolves the remaining organic solvent therein include methanol, ethanol, and 2-propanol.

The preparation of the separation membrane of the present invention can be accomplished by a process which comprises preparing a membrane having a non-porous dense layer made of a polyhydrazidoimide resin precursor from a polyhydrazidoimide resin precursor as a dope of non-porous dense layer in the same manner as described above, and then subjecting the membrane to heat treatment so that the polyhydrazidoimide resin precursor is cyclized into hydrazidoimide. This process is particularly useful when the polyhydrazidoimide resins cannot be dissolved or can hardly be dissolved in organic solvents, making them impossible to form a dope. If a precursor of polyhydrazidoimide resin containing copolymerizable components is used, the copolymerizable components may be heated at the same time so that they are subjected to cyclization into imide, imidazopyrrolone or the like.

The foregoing heat treatment may be effected under the condition that the non-porous dense layer made of the precursor substantially changes to hydrazidoimide structure, preferably under the condition that the other copolymerizable components changes to the final structure and, if the membrane is composite, the porous structure of the polymer constituting the porous layer cannot be destroyed by heating, e.g., at a temperature of 150° C. to 450° C., preferably from 150° C. to 350° C., under reduced pressure and/or in an inert gas atmosphere for 20 to 720 minutes, preferably 20 to 480 minutes. The term "under reduced pressure" as used herein is meant to indicate the condition that the resin constituting the membrane is insusceptible to deterioration by oxidation during heat treatment, i.e., pressure of not higher than 30 kPa, preferably not higher than 3 kPa. Examples of the inert gas include nitrogen, argon, and helium.

The change from the precursor to hydrazidoimide by heating can be easily confirmed by infrared absorption spectra (IR), e.g., when both characteristic absorption bands of amide bond and imide ring accompanied by the change from the precursor to hydrazidoimide are recognized. The former observed in the vicinity of 1,690 cm$^{-1}$. The later observed in the region of about 1,700 to 1,780 cm$^{-1}$ and 1,790 to 1,800 cm$^{-1}$.

In the preparation process of the present invention, the removal of the organic solvent used for dope is preferably effected before the heat treatment for cyclization into hydrazidoimide.

The separation membranes of the present invention are suitable for the application of air into oxygen and nitrogen, the separation and recovery of hydrogen from off-gas in the platforming process, the recovery of hydrogen during the synthesis of ammonia, the recovery of carbon dioxide and removal of nitrogen oxides or sulfur oxides from waste gas of thermal power generation or refuse incineration, the recovery of carbon dioxide from off-gas of oil well, the removal of acidic gases such as hydrogen sulfide and carbon dioxide from natural gas, the removal of carbon dioxide or separation of gas such as helium from land-fill gas, the gas-vapor or vapor-vapor separation such as dehumidification of air or organic vapor, the separation of water and alcohol, the pervaporation of volatile matter-containing liquid such as removal of water from an esterification reaction system, the removal of gas from a liquid, the dissolution of a specific gas in a liquid, etc. Of course, the use of the separation membrane of the present invention is not limited to these purposes.

EXAMPLES

The present invention will be further described in the following examples and comparative examples. The term "%" as used hereinafter is meant to indicate "% by weight" unless otherwise specified.

Example 1

19.419 g (0.1 mol) of isophthalic dihydrazide was suspended in 350 g of dehydrated N-methylpyrrolidone at room temperature in a nitrogen atmosphere. To the suspension obtained was then added batchwise 44.424 g (0.1 mol) of 4,4'-(hexafluoroisopropylidene)diphthalic anhydride. As the polymerization reaction proceeded, the solution gradually became homogeneous. After the solution was visually confirmed to become almost transparent, 24.424 g (0.2 mol) of benzoic acid was added to the solution as a reaction aid. The reaction solution was directly allowed to undergo reaction with stirring for 1 hour. To the reaction solution was then added 15.820 g (0.2 mol) of pyridine as a reaction aid. The reaction solution was then allowed to undergo reaction with stirring for 1 hour. The reaction solution thus obtained was then added dropwise to a large amount of water. The solid matter precipitated was washed with a large amount of water several times, temporarily dried with 100° C. hot air, and then dried at a temperature of 100° C. in vacuo to obtain a precursor polymer of polyhydrazidoimide. The solid matter obtained is then subjected to heat treatment at a temperature of 250° C. in vacuo for 8 hours to obtain a thermally cyclized polyhydrazidoimide solid matter.

A 20% N-methylpyrrolidone solution of the polyhydrazidoimide obtained was then prepared. The solution was cast over a glass plate, and then dried at a temperature of 100° C. to form a film-like solid matter which was then dried at a temperature of 350° C. in vacuo for 8 hours to obtain a 25-μm thick film-like dense symmetric membrane made of polyhydrazidoimide.

The dense symmetric membrane obtained exhibited a sufficient strength even after subjected to heat treatment at a temperature of 350° C. The membrane was also insoluble in methanol, ethanol, 2-propanol, hexane, dichloromethane and N-methylpyrrolidone.

The dense symmetric membrane was measured for permeability coefficient with respect to pure oxygen and nitrogen gases at a temperature of 250° C. and a differential pressure of 0.2 MPa in accordance with ASTM (American Society of Testing Materials) D1434. The oxygen/nitrogen separation factor calculated is set forth in Table 1.

Example 2

The procedure of Example 1 was followed except that 19.419 g (0.1 mol) of terephthalic dihydrazide was used instead of isophthalic dihydrazide. As a result, a 25-μm thick film-like dense symmetric membrane made of polyhydrazidoimide was obtained. The membrane was measured for oxygen and nitrogen permeability coefficients. The oxygen/nitrogen separation factor calculated is set forth in Table 1.

Example 3

4.086 g (0.03 mol) of 2,5-dimethyl-1,4-phenylenediamine was dissolved as a copolymerizable compound in 350 g of dehydrated N-methylpyrrolidone at room temperature in a nitrogen atmosphere. 13.593 g (0.07 mol) of isophthalic dihydrazide was then suspended in the solution obtained. To the suspension obtained was then added batchwise 44.424 g (0.1 mol) of 4,4'-(hexafluoro isopropylidene)diphthalic anhydride. The reaction mixture was then subjected to reaction and treatment in the same manner as in Example 1 to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor calculated is set forth in Table 1.

Example 4

4.746 g (0.03 mol) of 1,5-naphthalenediamine was dissolved as a copolymerizable compound in 350 g of dehydrated N-methylpyrrolidone at room temperature in a nitrogen atmosphere. 13.593 g (0.07 mol) of isophthalic dihydrazide was then suspended in the solution obtained. To the suspension obtained was then added batchwise 44.424 g (0.1 mol) of 4,4'-(hexafluoro isopropylidene)diphthalic anhydride. The reaction mixture was then subjected to reaction and treatment in the same manner as in Example 1 to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor calculated is set forth in Table 1.

Example 5

9.373 g (0.03 mol) of 3,3'-dimethylnaphthidine was dissolved as a copolymerizable compound in 350 g of dehydrated N-methylpyrrolidone at room temperature in a nitrogen atmosphere. 13.593 g (0.07 mol) of isophthalic dihydrazide was then suspended in the solution obtained. To the suspension obtained was then added batchwise 44.424 g (0.1 mol) of 4,4'-(hexafluoro isopropylidene)diphthalic anhydride. The reaction mixture was then subjected to reaction and treatment in the same manner as in Example 1 to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor thus calculated is set forth in Table 1.

Example 6

4.086 g (0.03 mol) of 2,5-dimethyl-1,4-phenylenediamine was dissolved as a copolymerizable compound in 350 g of dehydrated N-methylpyrrolidone at room temperature in a nitrogen atmosphere. 13.593 g (0.07 mol) of terephthalic dihydrazide was then suspended in the solution obtained. To the suspension thus obtained was then added batchwise 44.424 g (0.1 mol) of 4,4'-(hexafluoro isopropylidene) diphthalic anhydride. The reaction mixture was then subjected to reaction and treatment in the same manner as in Example 1 to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor thus calculated is set forth in Table 1.

Example 7

9.710 g (0.05 mol) of isophthalic dihydrazide and 10.714 g (0.05 mol) of 3,3',4,4'-tetraaminobiphenyl as a copolymerizable compound were dissolved in 200 g of dehydrated N-methylpyrrolidone at room temperature in a nitrogen atmosphere. The solution obtained was then diluted with 150 g of sulfolane. To the solution thus obtained was then added batchwise 44.424 g (0.1 mol) of 4,4'-(hexafluoroisopropylidene)diphthalic anhydride. After 4,4,-(hexafluoroisopropylidene)diphthalic anhydride was visually confirmed to undergo almost complete dissolution, 33.142 g (0.2 mol) of tetraethylammonium chloride was added to the solution as a reaction aid. The reaction solution was then allowed to undergo reaction with stirring for 2 hours. The reaction solution thus obtained was then added dropwise to a large amount of isopropyl alcohol. The solid matter precipitated was washed with a large amount of water several times. The water content in the solid matter was then thoroughly replaced by isopropyl alcohol. The solid matter was then dried at a temperature of 100° C. in vacuo to obtain a purified polyhydrazidoimide resin precursor polymer containing a copolymerizable component.

A 20% N-methylpyrrolidone solution of the precursor polymer obtained was then prepared. The solution was cast over a glass plate, and then dried at a temperature of 100° C. to form a film-like solid matter which was then dried at a temperature of 350° C. in vacuo for 8 hours so that the precursor polymer was cyclized into hydrazidoimide and imidazopyrrolone to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor thus calculated is set forth in Table 1.

Example 8

11.651 g (0.06 mol) of isophthalic dihydrazide was suspended in 200 g of dehydrated N-methylpyrrolidone at room temperature in a nitrogen atmosphere. At the same time, 2.7240 g (0.02 mol) of 2,5-dimethyl-1,4-phenylenediamine as a copolymerizable compound was dissolved in the system. The solution obtained was then diluted with 150 g of sulfolane. To the solution thus obtained was then added batchwise 44.424 g (0.1 mol) of 4,4'-(hexafluoro isopropylidene)diphthalic anhydride. As the polymerization reaction proceeded, the solution gradually became homogeneous. After the solution was visually confirmed to become almost transparent, 4.285 g (0.02 mol) of 3,3',4,4'-tetraaminobiphenyl was added to the reaction system. After the reaction mixture was visually confirmed to undergo almost complete dissolution, 24.424 g (0.2 mol) of benzoic acid was added to the solution as a reaction aid. The reaction solution was directly allowed to undergo reaction with stirring for 1 hour. To the reaction solution was then added 15.820 g (0.2 mol) of pyridine as a reaction aid. The reaction solution was then allowed to undergo reaction with stirring for 1 hour. The reaction mixture was then subjected to reaction and treatment in the same manner as in Example 7 to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor calculated is set forth in Table 1.

Example 9

4.746 g (0.03 mol) of 1,5-naphthalenediamine as a copolymerizable compound was dissolved in 350 g of dehydrated N-methylpyrrolidone at room temperature in a nitrogen atmosphere. 17.098 g (0.07 mol) of 2,6-naphthalenedicarboxylic dihydrazide was suspended in the solution. To the solution obtained was then added batchwise 44.424 g (0.1 mol) of 4,4'-(hexafluoroisopropylidene) diphthalic anhydride. The mixture was then heated to a temperature of 60° C. After the solution was visually confirmed to become homogeneous and almost transparent, the solution was further allowed to undergo reaction with stirring at room temperature for 3 hours. The reaction mixture was then subjected to reaction and treatment in the same manner as in Example 1 to obtain a 25-μm thick film-like dense symmetric membrane made of a polyhydrazidoimide resin containing a copolymerizable component. The membrane was measured for oxygen and nitrogen permeability coefficients. The oxygen/nitrogen separation factor calculated is set forth in Table 1.

Comparative Example 1

10.814 g (0.1 mol) of p-phenylenediamine was dissolved in 300 g of dehydrated N-methylpyrrolidone at room temperature in a nitrogen atmosphere. To the solution obtained was then added batchwise 44.424 g (0.1 mol) of 4,4'-(hexafluoroisopropylidene)diphthalic anhydride. The mixture was then stirred for 2 hours. The reaction solution was then diluted with 300 g of N-methylpyrrolidone. To the reaction solution were then added 31.640 g of pyridine and 40.836 g of acetic anhydride as reaction aids. The reaction mixture was then allowed to undergo reaction with stirring for 1 hour. The reaction mixture was then allowed to undergo reaction with stirring at a temperature of 55° C. for 1 hour. The reaction solution obtained was allowed to cool to room temperature, and then added dropwise to a large amount of methanol. The solid matter precipitated was washed with a large amount of water several times. The remaining solvent was then replaced by methanol. The solid matter was then dried at a temperature of 100° C. in vacuo to obtain a purified polyimide.

A 20% N-methylpyrrolidone solution of the polyimide obtained was then prepared. The solution was cast over a glass plate, and then dried at a temperature of 100° C. to form a film-like solid matter which was then dried at a temperature of 250° C. in vacuo for 8 hours to obtain a 25-μm thick film-like dense symmetric membrane made of a polyimide. The membrane was measured for oxygen and nitrogen permeability coefficients. The oxygen/nitrogen separation factor calculated is set forth in Table 1.

The polyimide used in Comparative Example 1 was synthesized in the same manner as in Example 2 except that p-phenylenediamine was used instead of terephthalic dihydrazide. This resin has a structure similar to that of the polyhydrazidoimide of Example 2. However, it is obvious that the dense symmetric membrane prepared from this resin is inferior to that prepared from the polyhydrazidoimide obtained in Example 2 in permeation selectivity as shown in FIG. 1. Thus, it can be understood that polyhydrazidoimides are superior over other resins.

Comparative Example 2

The procedure of Comparative Example 1 was followed except that 22.727 g (0.1 mol) of 4,4'-diaminobenzanilide was used instead of p-phenylenediamine. As a result, a 25-μm thick film-like dense symmetric membrane made of a polyamideimide. The membrane was measured for oxygen and nitrogen permeability coefficients. The oxygen/nitrogen separation factor calculated is set forth in Table 1.

The polyamideimide used in Comparative Example 2 was synthesized in the same manner as in Example 2 except that 4,4'-diaminobenzanilide, which is an amide-containing diamine, was used instead of terephthalic dihydrazide. This resin has a structure similar to that of the polyhydrazidoimide of Example 2. However, it is obvious that the dense symmetric membrane prepared from this resin is inferior to that prepared from the polyhydrazidoimide obtained in Example 2 in permeation selectivity as shown in FIG. 1. This shows that the simple occurrence of both amide and imide components is not sufficient to exert an effect of providing a high selectivity. Thus, it can be understood that the hydrazidoimide structure is superior over other structures.

Comparative Example 3

The procedure of Comparative Example 1 was followed except that 21.624 g (0.1 mol) of 3,3'-diamino-4,4'-dihydroxybiphenyl was used instead of p-phenylenediamine. As a result, a 25-μm thick film-like dense symmetric membrane made of a polyimide. The membrane was measured for oxygen and nitrogen permeability coefficients. The oxygen/nitrogen separation factor calculated is set forth in Table 1.

The polyimide used in Comparative Example 3 has almost the same oxygen permeability as that of the polyhydrazidoimide resin of Example 3 or 4. However, FIG. 1 shows that the dense symmetric membrane formed from the polyimide used in Comparative Example 3 is inferior to that formed from polyhydrazidoimides in permeation selectivity. Thus, it can be understood that the polyhydrazidoimide structure is superior over other structures.

TABLE 1

|  | Gas permeability coefficient (barrier) | | Separation factor |
| --- | --- | --- | --- |
|  | Oxygen | Nitrogen | Oxygen/nitrogen |
| Example |  |  |  |
| 1 | 0.641 | 0.0803 | 7.98 |
| 2 | 0.635 | 0.0794 | 8.00 |
| 3 | 1.24 | 0.174 | 7.13 |
| 4 | 1.17 | 0.164 | 7.13 |
| 5 | 1.96 | 0.282 | 6.95 |
| 6 | 1.75 | 0.248 | 7.06 |
| 7 | 2.69 | 0.368 | 7.31 |
| 8 | 1.68 | 0.240 | 7.00 |
| 9 | 0.853 | 0.120 | 7.11 |
| Comparative Example |  |  |  |
| 1 | 4.19 | 0.784 | 5.34 |
| 2 | 2.73 | 0.457 | 5.97 |
| 3 | 1.10 | 0.173 | 6.36 |

Example 10

A 20% dimethylacetamide solution of the polyhydrazidoimide resin obtained in Example 1 was filtered through a stainless steel filter having a filter pore diameter of 20 μm while being kept at a temperature of 60° C. The filtrate was then defoamed under reduced pressure to obtain a spinning dope (a). Separately, a 27% N-methylpyrrolidone solution of a polyimide ("MATRIMID 5218", available from Asahi-Ciba Limited) was filtered through a stainless steel filter having a filter pore diameter of 20 μm while being kept at 60° C. The filtrate was then defoamed under reduced pressure to obtain a spinning dope (b).

Using a multiple tubular capillary nozzle having nozzle diameters of 1.8 mmφ, 1.5 mmφ, 1.1 mmφ, 0.4 mmφ and 0.2 mmφ, the dope (b) and the dope (a) which had been heated to a temperature of about 70° C. were simultaneously jetted into an air atmosphere through an inner tubular nozzle and an outer tubular nozzle at a rate of about 3 g/min. and about 0.6 g/min., respectively, while water was flowing through a central nozzle. The material jetted was then continuously introduced into water which had been adjusted to 5° C. so that it was coagulated to form a hollow fiber which was then continuously wound on a bobbin at a rate of about 18 m/min. The hollow fiber obtained was dipped in an about 50° C. flowing water until it was thoroughly washed, dried at 100° C. in vacuo, and then subjected to heat at 350° C. in vacuo for 8 hours to obtain hollow fiber composite membranes.

The hollow fiber composite membrane obtained had an inner diameter of about 240 μm and an outer diameter of about 480 μm. A section of the hollow fiber was observed under a microscope. As a result, it was confirmed that the ratio of the thickness of the porous supporting layer provided on the inner side of the hollow fiber to that of the polyhydrazidoimide resin layer provided on the outer side of the hollow fiber is about 6:1 and the polyhydrazidoimide resin layer provided on the outer side of the hollow fiber has an asymmetrical structure comprising a dense layer formed on the surface of the hollow fiber and a porous layer supporting the dense layer.

The hollow fiber composite membrane obtained was measured for permeation rate with respect to pure oxygen and nitrogen gases at a temperature of 25° C. and a differential pressure of 0.2 MPa by a process which comprises pressing the inner side of the hollow fiber in accordance with ASTM D1434. The oxygen/nitrogen separation factor calculated is set forth in Table 2.

Example 11

A hollow fiber composite membrane was obtained in the same manner as in Example 10 except that the N-methylpyrrolidone solution of a polyimide ("MATRIMID 5218", available from Asahi-Ciba Limited) to be used as the spinning dope (b) was replaced by a polyimide solution ("Rikacoat SN20", available from New Japan Chemical Co., Ltd.).

The composite hollow fiber membrane obtained was measured for oxygen and nitrogen permeation rates in the same manner as in Example 10. The oxygen/nitrogen separation factor calculated is set forth in Table 2.

Example 12

A composite hollow fiber membrane was obtained in the same manner as in Example 10 except that the polyimide ("MATRIMID 5218", available from Asahi-Ciba Limited) to be used as the resin for the spinning dope (b) was replaced by a polyamide ("Cornex", available from Teijin Ltd.).

The composite hollow fiber membrane obtained was measured for oxygen and nitrogen permeation rates in the same manner as in Example 10. The oxygen/nitrogen separation factor calculated is set forth in Table 2.

Example 13

A composite hollow fiber membrane was obtained in the same manner as in Example 10 except that the N-methylpyrrolidone solution of a polyimide ("MATRIMID 5218", available from Asahi-Ciba Limited) to be used as the spinning dope (b) was replaced by a resin solution comprising 17.5% of "MATRIMID 5218", 7.5% of a polyetherimide ("Ultem 1000", available from GE Plastics Japan) and 75% of N-methylpyrrolidone.

The composite hollow fiber membrane obtained was measured for oxygen and nitrogen permeation rates in the same manner as in Example 10. The oxygen/nitrogen separation factor calculated is set forth in Table 2.

Example 14

A hollow fiber composite membrane was obtained in the same manner as in Example 10 except that the N-methylpyrrolidone solution of a polyimide ("MATRIMID 5218", available from Asahi-Ciba Limited) to be used as the spinning dope (b) was replaced by a resin solution comprising 20% of "MATRIMID 5218", 5% of a polyethersulfone ("RADEL A100", available from Amoco Japan Limited) and 75% of N-methylpyrrolidone.

The composite hollow fiber membrane obtained was measured for oxygen and nitrogen permeation rates in the same manner as in Example 10. The oxygen/nitrogen separation factor calculated is set forth in Table 2.

Example 15

A composite hollow fiber membrane was obtained in the same manner as in Example 10 except that the polyhydrazidoimide resin obtained in Example 1 to be used as the resin for the spinning dope (a) was replaced by the polyhydrazidoimide resin obtained in Example 2 and the N-methylpyrrolidone solution of a polyimide ("MATRIMID 5218", available from Asahi-Ciba Limited) to be used as the spinning dope (b) was replaced by a resin solution comprising 10% of "MATRIMID 5218", 15% of a polybenzimidazole and 75% of N-methylpyrrolidone.

The composite hollow fiber membrane obtained was measured for oxygen and nitrogen permeation rates in the same manner as in Example 10. The oxygen/nitrogen separation factor calculated is set forth in Table 2.

Example 16

A composite hollow fiber membrane was obtained in the same manner as in Example 10 except that the polyhydrazidoimide resin obtained in Example 1 to be used as the resin for the spinning dope (a) was replaced by the polyhydrazidoimide resin obtained in Example 3 and the N-methylpyrrolidone solution of a polyimide ("MATRIMID 5218", available from Asahi-Ciba Limited) to be used as the spinning dope (b) was replaced by a resin solution comprising 17.5% of "MATRIMID 5218", 7.5% of a polyetherimide ("Ultem 1000", available from GE Plastics Japan) and 75% of N-methylpyrrolidone.

The composite hollow fiber membrane obtained was measured for oxygen and nitrogen permeation rates in the same manner as in Example 10. The oxygen/nitrogen separation factor calculated is set forth in Table 2.

Example 17

A composite hollow fiber membrane was obtained in the same manner as in Example 10 except that the polyhydrazidoimide resin obtained in Example 1 to be used as the resin for the spinning dope (a) was replaced by the precursor polymer of polyhydrazidoimide resin obtained in Example 7 and the N-methylpyrrolidone solution of a polyimide ("MATRIMID 5218", available from Asahi-Ciba Limited) to be used as the spinning dope (b) was replaced by a resin solution comprising 15% of "MATRIMID 5218" and 85% of a polyimide solution ("Rikacoat SN20", available from New Japan Chemical Co., Ltd.). The composite hollow fiber membrane obtained was then subjected to heat treatment at 350° C. in vacuo for 4 hours so that the amide amino acid component as a copolymerizable component was cyclized into imidazopyrrolone to obtain a composite hollow fiber membrane.

The composite hollow fiber membrane obtained was measured for oxygen and nitrogen permeation rates in the same manner as in Example 10. The oxygen/nitrogen separation factor calculated is set forth in Table 2.

Example 18

A composite hollow fiber membrane was obtained in the same manner as in Example 10 except that the polyhydrazidoimide resin obtained in Example 1 to be used as the resin for the spinning dope (a) was replaced by the polyhydrazidoimide resin obtained in Example 9 and the N-methylpyrrolidone solution of a polyimide ("MATRIMID 5218", available from Asahi-Ciba Limited) to be used as the spinning dope (b) was replaced by the same resin solution as used in Example 17.

The composite hollow fiber membrane obtained was measured for oxygen and nitrogen permeation rates in the same manner as in Example 10. The oxygen/nitrogen separation factor calculated is set forth in Table 2.

TABLE 2

| Example | Gas permeation rate [$\times 10^{-5} cm^3$(STP)/$cm^2$ sec.cmHg] | | Separation factor |
|---|---|---|---|
|  | Oxygen | Nitrogen | Oxygen/nitrogen |
| 10 | 0.795 | 0.0995 | 7.99 |
| 11 | 0.927 | 0.118 | 7.86 |
| 12 | 0.873 | 0.109 | 8.01 |
| 13 | 1.12 | 0.141 | 7.94 |
| 14 | 1.03 | 0.129 | 7.98 |
| 15 | 0.774 | 0.0974 | 7.95 |
| 16 | 1.27 | 0.179 | 7.09 |
| 17 | 2.41 | 0.329 | 7.33 |
| 18 | 0.934 | 0.132 | 7.08 |

The separation membrane of the present invention has a good balance between separation properties and permeability, excellent particularly in gas separation properties, and is excellent in properties such as strength, heat resistance, solvent resistance and durability.

While the invention has been described in detail and with reference to specific embodiments thereof, it will be apparent to one skilled in the art that various changes and modifications can be made therein without departing from the spirit and scope thereof.

What is claimed is:

1. Gas-separation membranes having a non-porous dense layer formed from polyhydrazidoimide resins.

2. The separation membranes according to claim 1, having a composite structure comprising said non-porous dense layer formed form said polyhydrazidoimide resins and a porous supporting layer formed from materials different from the resin constituting said non-porous dense layer.

3. The separation membranes according to claim 2, wherein said polyhydrazidoimide resin is a polymer obtained from the reaction of an aromatic tetracarboxylic dianhydride and an aromatic dihydrazide as essential components.

4. The separation membranes according to claim 3, wherein said aromatic tetracarboxylic dianhydride is 4,4'-(hexafluoroisopropylidene)diphthalic anhydride.

5. The separation membranes according to claim 3, wherein said aromatic dihydrazide is isophthalic dihydrazide or terephthalic dihydrazide.

6. The separation membranes according to claim 1, wherein said polyhydrazidoimide resins are polymers obtained from the reaction of aromatic tetracarboxylic dianhydrides and aromatic dihydrazides as essential components.

7. The separation membranes according to claim 6, wherein said aromatic tetracarboxylic dianhydride is 4,4'-(hexafluoroisopropylidene)diphthalic anhydride.

8. The separation membranes according to claim 6, wherein said aromatic dihydrazide is isophthalic dihydrazide or terephthalic dihydrazide.

* * * * *